US00RE36379E

United States Patent [19]

Slivon et al.

[11] E Patent Number: Re. 36,379

[45] Reissued Date of Patent: Nov. 9, 1999

[54] TOOL CHEST WITH TOOL PALLET

[75] Inventors: George R. Slivon, Kenosha; Nancy C. Rittmann Gasperi, Racine; Kenneth C. Happ, Burlington, all of Wis.; Erick E. Alfaro, Thornhill, Canada; Roman L. Bauer, Toronto, Canada; Alex F. Burns, Scarborough, Canada; Jason Chak Chung Chan, Richmond Hill, Canada; Alois Kadlecek, Bradford, Canada; George A. Niles, Toronto, Canada

[73] Assignee: Snap-on Technologies, Inc., Lincolnshire, Ill.

[21] Appl. No.: 08/731,115

[22] Filed: Oct. 9, 1996

Related U.S. Patent Documents

Reissue of:

[64] Patent No.: 5,332,305
Issued: Jul. 26, 1994
Appl. No.: 07/850,434
Filed: Mar. 12, 1992

U.S. Applications:

[63] Continuation of application No. 08/518,469, Aug. 21, 1995, abandoned.

[51] Int. Cl.[6] ..... A47B 88/00

[52] U.S. Cl. ..... 312/328; 312/271

[58] Field of Search ..... 312/271, 270.2

[56] References Cited

U.S. PATENT DOCUMENTS

| | | | |
|---|---|---|---|
| 407,009 | 7/1889 | Horwitz . | |
| 490,884 | 1/1893 | Peterson et al. . | |
| 1,488,456 | 3/1924 | Harper | 312/902 |
| 1,497,379 | 6/1924 | Morse . | |
| 1,761,331 | 6/1930 | Dewey . | |
| 1,984,345 | 12/1934 | Kennedy | 312/293.2 X |
| 2,152,378 | 3/1939 | Gelbaugh . | |
| 2,264,419 | 12/1941 | Unger et al. . | |
| 2,272,303 | 2/1942 | Kriegbaum et al. | 220/255 |
| 2,570,636 | 10/1951 | Bolling . | |
| 2,596,043 | 5/1952 | Piker . | |
| 2,657,793 | 11/1953 | Goldshire | 206/6.1 X |
| 2,675,290 | 4/1954 | Berry . | |
| 2,778,704 | 1/1957 | Joachim . | |
| 2,823,971 | 2/1958 | Hoyt . | |
| 3,012,658 | 12/1961 | Flora . | |
| 3,062,606 | 11/1962 | Magrauth . | |
| 3,995,926 | 12/1976 | Kessler, Sr. . | |
| 4,150,861 | 4/1979 | Dufrancatel . | |
| 4,266,835 | 5/1981 | Schmidt . | |
| 4,285,556 | 8/1981 | Loeffel | 312/244 |
| 4,285,557 | 8/1981 | Paladino et al. . | |
| 4,288,134 | 9/1981 | Knaack et al. . | |
| 4,378,828 | 4/1983 | Shiminski | 312/902 |
| 4,723,821 | 2/1988 | Montgomery . | |
| 4,775,201 | 10/1988 | Thomson . | |
| 4,783,131 | 11/1988 | Grass . | |

FOREIGN PATENT DOCUMENTS

| | | |
|---|---|---|
| 0474968 | 3/1992 | European Pat. Off. . |
| 2703367 | 8/1978 | Germany . |
| 469845 | 8/1937 | United Kingdom . |

*Primary Examiner*—Peter M. Cuomo
*Assistant Examiner*—Janet M. Wilkens
*Attorney, Agent, or Firm*—Emrich & Dithmar

[57] ABSTRACT

A tool chest includes a lidded base defining a storage compartment therein and a pegboard-type tool pallet adapted to carry tools on an obverse side thereof and shiftable between a first position overlying and covering the storage compartment with the obverse side up, and a second position upstanding from the rear end of the base with the obverse side forward and supported against the open lid for uncovering and providing access to the storage compartment. In one embodiment the pallet is pivotally connected to the base with a link arm and has handles for lifting the pallet between its first and second position. In a second embodiment the pallet is pivotally connected to the lid so that when the lid is opened it pulls the pallet up to its second position. The front end of the pallet has pins or rollers supported on guide rails for guiding movement between the first and second positions.

8 Claims, 6 Drawing Sheets

30
31
32
33
35
36
37
38
39
41
42
43
44
44a
44b
45
46
47
48
49
49a
50
51
51a
52
53
54
55
56
58
59
60
61
62
63
64
64a
65
66
67
67a
68
69
22
23
27
29

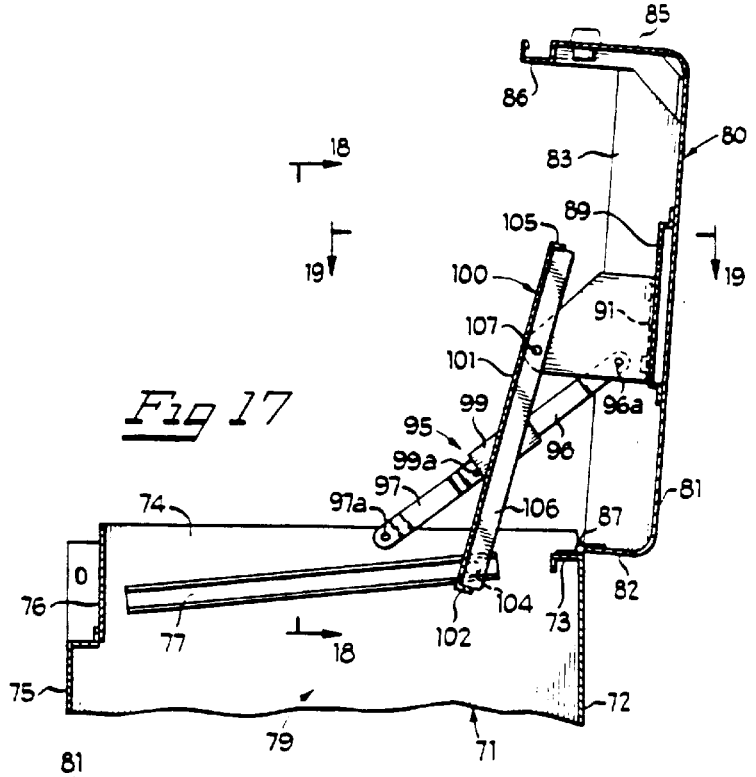
Fig 17
Fig 18
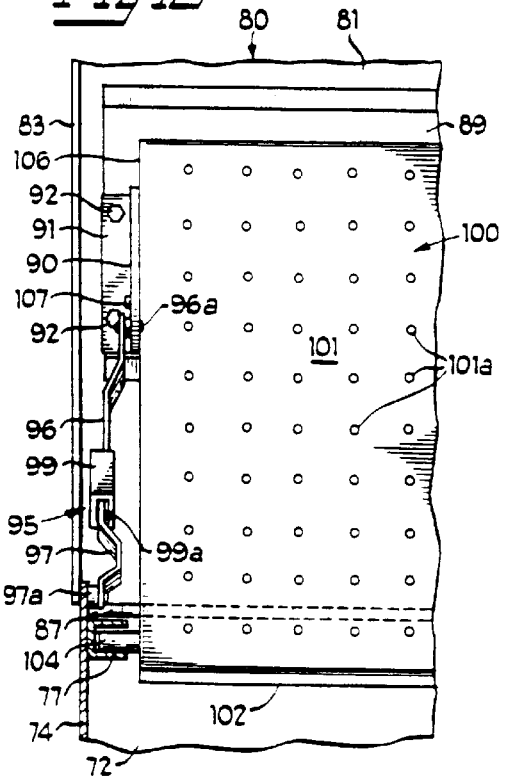
Fig 19
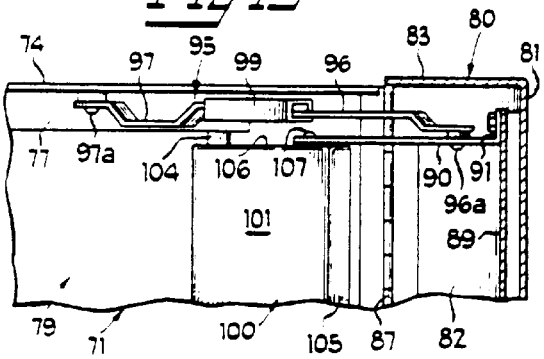

TOOL CHEST WITH TOOL PALLET

Matter enclosed in heavy brackets [ ] appears in the original patent but forms no part of this reissue specification; matter printed in italics indicates the additions made by reissue.

*This is a continuation of application Ser. No. 08/518,469, filed Aug. 21, 1995, now abandoned.*

BACKGROUND OF THE INVENTION

1. Field of the Invention

The present invention relates to tool boxes and chests, and in particular, to lidded tool chests.

2. Description of the prior Art

Typically, a lidded tool chest has a lid or cover which is hinged to a base at the rear end thereof for movement between open and closed positions with respect to the base to cover and expose a storage compartment within the base. It is known to provide one or more trays overlying the storage compartment and hingedly interconnected to the base and to the cover so that, when a cover is opened, the trays are pulled upwardly and rearwardly to expose their contents and also to provide access to the storage compartment, the trays remaining in a substantially horizontal position throughout. In such an arrangement, the mechanic or other user must be directly over the tool box to view the contents of the trays and storage compartment.

It is also known to provide storage containers with shelves or trays which are pivotally movable between horizontal and upright or partially upright positions. One such arrangement is disclosed in U.S. Pat. No. 3,012,658, which has a pair of base straps or rails, to the front end of which is pivoted a tool-carrying panel and to the rear end of which is pivoted a cover. When the device is opened, the panel tilts upwardly to an inclined position to display the tools to the user, the panel being propped against the upwardly inclined cover to form a triangular configuration. However, this device arrangement has no base with a storage compartment therein.

SUMMARY OF THE INVENTION

It is a general object of the invention to provide an improved tool chest which avoids the disadvantages of prior tool chests while affording additional structural and operating advantages.

An important feature of the invention is the provision of a tool chest or receptacle defining a storage compartment therein, which includes a tool-carrying pallet or panel disposable in an upright display position on the receptacle while affording access to the storage compartment.

In connection with the foregoing feature, another feature of the invention is the provision of a tool chest of the type set forth which is provided with a lid or cover which cooperates with the pallet to provide support therefor.

Still another feature of the invention is the provision of the tool chest of the type set forth which provides a guided interconnection between the pallet and the receptacle to guide movement of the pallet between display and storage positions.

Still another feature of the invention is the provision of a tool chest of the type set forth wherein the pallet is coupled to the cover so as to be movable in response to movement of the cover.

Another feature of the invention is the provision of a tool chest of the type set forth, which is of relatively simple and economical construction.

These and other features of the invention are attained in an open-top receptacle having a forward end and a rearward end and defining a storage compartment therein, the improvement comprising: a pallet having an obverse side for supporting articles thereon and shiftable between first and second positions relative to the receptacle, the pallet in its first position overlying and covering the storage compartment with the obverse side facing upwardly, the pallet in its second position upstanding from the rearward end of the receptacle with the obverse side facing forwardly so as to uncover the storage compartment and permit access thereto, and support means associated with the receptacle for supporting the pallet in each of its first and second positions.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

FIG. 17 is a view similar to FIG. 16, illustrating the cover in its fully opened position;

FIG. 18 is a further enlarged, fragmentary view in vertical section taken along the line 18—18 in FIG. 17; and FIG. 19 is a fragmentary view in horizontal section taken along the line 19—19 in FIG. 17.

DESCRIPTION OF THE PREFERRED EMBODIMENTS

Figure 1:
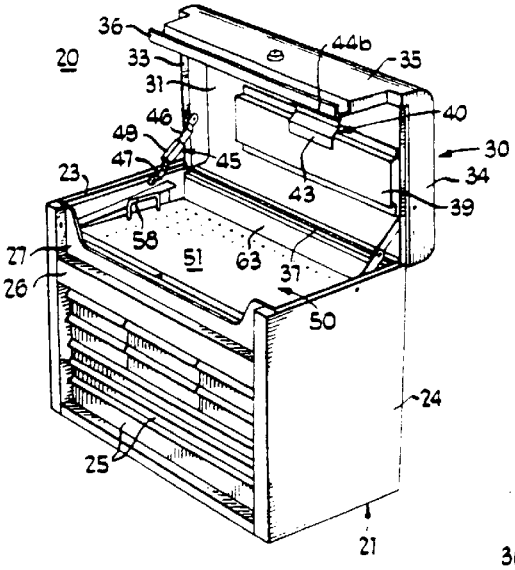
FIG. 1 is a front perspective view of a tool chest constructed in accordance with a first embodiment of the present invention, with the cover open and the tool pallet in its stowed position.
Figure 2:
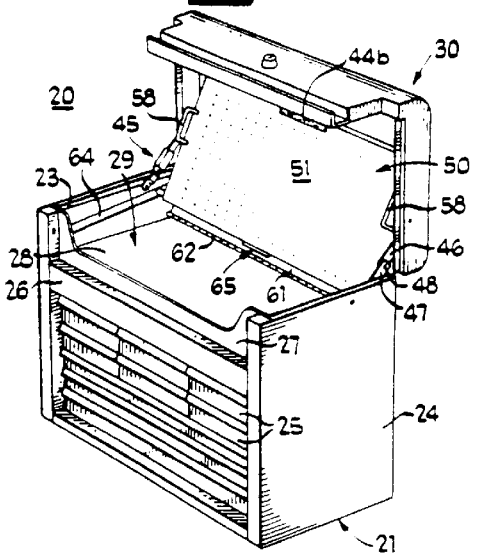
FIG. 2 is a view similar to FIG. 1 illustrating the tool pallet in its display position.

Referring to FIGS. 1 and 2, there is illustrated a tool chest, generally designated by the numeral 20, constructed in accordance with a first embodiment of the invention. The tool chest 20 has a box-like base 21 including an upstanding rear wall 22 (FIGS. 3–7), a pair of upstanding side walls 23 and 24 and a base or bottom wall (not shown), cooperating to define an open-top and open-front housing. A plurality of drawers 25 may be mounted in the base 21 in a known manner. The side walls 23 and 24 are interconnected at their front ends by a cross bar 26 above the drawers 25 and by an upstanding front wall 27 which is connected to and projects upwardly from the cross bar 26. A flat, horizontal top wall 28 interconnects the rear wall 22, the side walls 23 and 24 and the cross bar 26 for cooperation therewith to define an open-top storage compartment 29 above the drawers 25.

Figure 3:
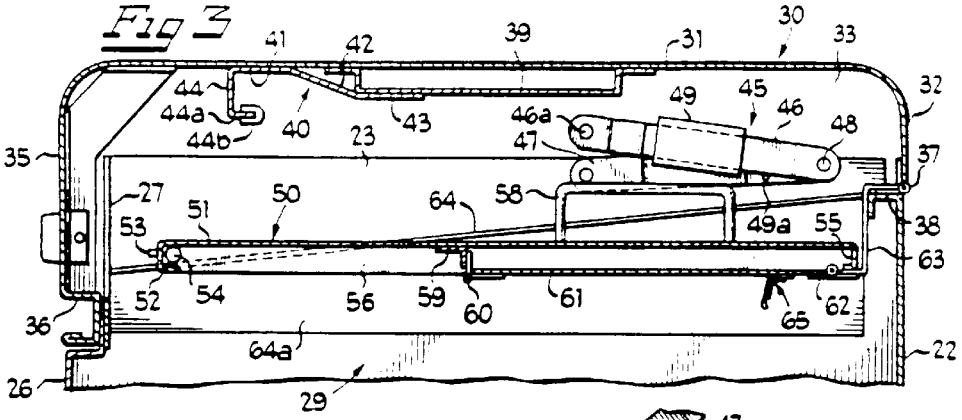
FIG. 3 is an enlarged, fragmentary view in vertical section of a portion of the tool chest of FIG. 1, with the cover closed.
Figure 4:
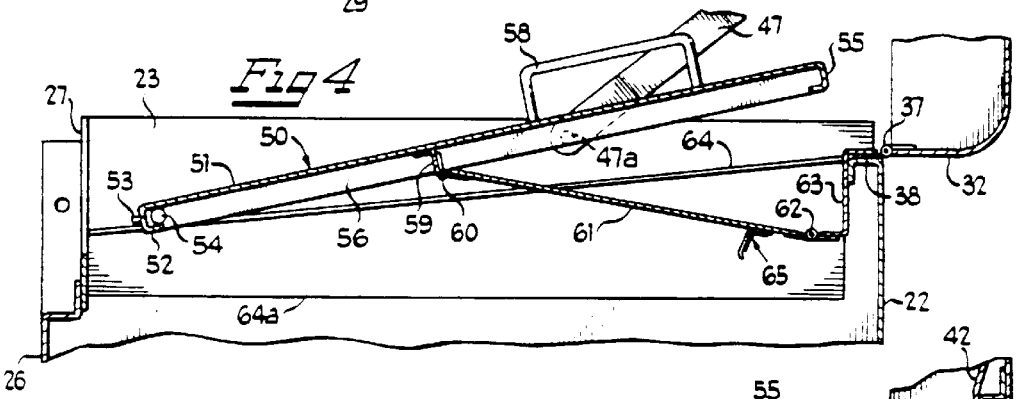
FIG. 4 is a view similar to FIG. 3, with the cover open and with the tool pallet lifted slightly from its stowed position.
Figure 5:
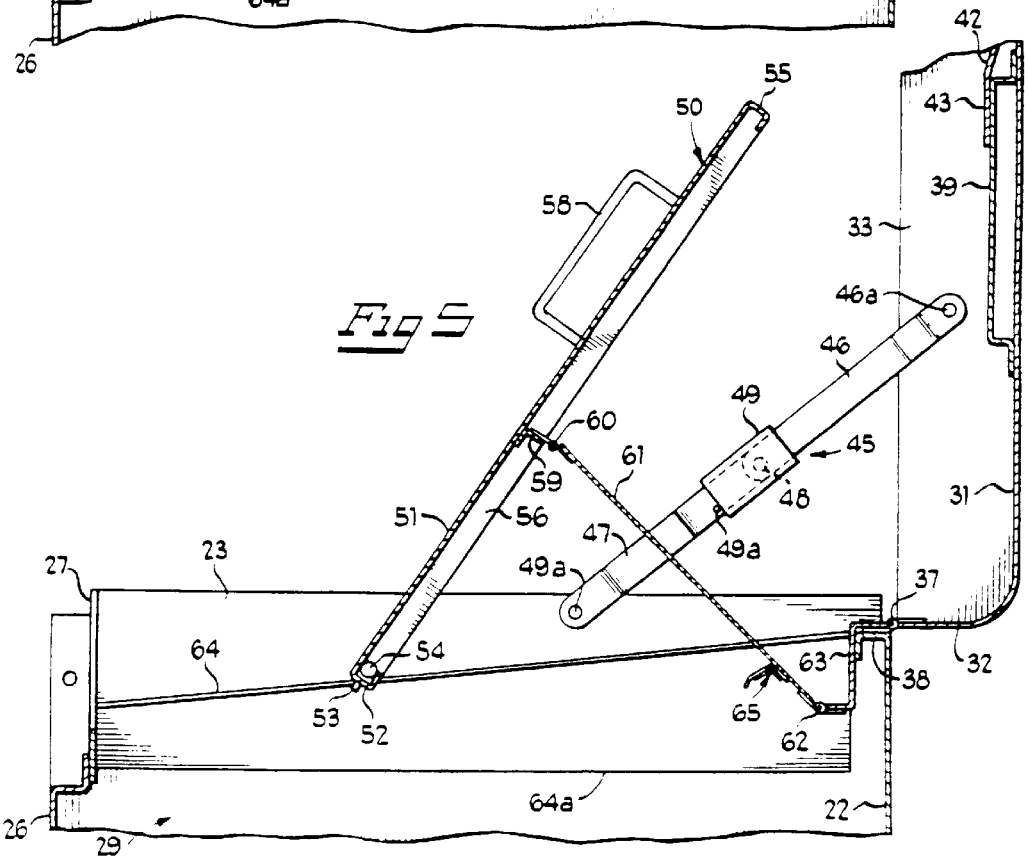
FIG. 5 is a view similar to FIG. 4, with the tool pallet lifted further from its stowed position.

Referring also to FIGS. 3–5, the tool chest 20 is also provided with a cover 30, which is pivotally movable between a closed position (FIG. 3) which completely closes the storage compartment 29 and open position, illustrated in FIGS. 1, 2, 4 and 5. The cover 30 has a flat top wall 31, a rear wall 32, a pair of side walls 33 and 34 and a front wall 35 which projects downwardly below the bottom edges of the rear wall 32 and the side walls 33 and 34 and is bent at its lower end to define a channel 36. The bottom edge of the rear wall 32 is pivotally connected by means of a piano hinge 37 to a forwardly projecting top flange 38 at the upper end of the base rear wall 22. Fixedly secured to the inner surface of the cover top wall 31 is an elongated stiffening channel 39. Also carried by the cover top wall 31 is a retainer bracket 40, for a purpose to be explained more fully below. Specifically, the retainer bracket 40 has a flat base wall 41 which lies against the inner surface of the cover top wall 31 and is provided at its rear edge with an inclined wall 42 which slopes rearwardly away from the top wall 31 and is provided at its rear edge with a skirt 43 which is fixedly secured to the front surface of the stiffening channel 39. The base wall 41 is provided at its forward edge with a depending end wall 44 provided at its lower end with a rearwardly extending lip 44a covered with a guard 44b.

The cover 30 is also coupled to the base 21 at the opposite sides thereof, respectively, by two linkage assemblies 45. Each of the linkage assemblies 45 includes an upper link 46 pivotally connected to the adjacent cover side wall (33 or 34), as at 46a, and a lower link 47, pivotally coupled to the adjacent base side wall (23 or 24), as at 47a. The links 46 and 47 are pivotally interconnected by a pivot pin 48. A sleeve 49 is fitted around the upper link 46 of one of the linkage assemblies 45 and slides down to cover the pivot pin 48 (see FIG. 5) to lock the cover 30 in its open position, downward sliding movement of the sleeve 49 being stopped by a pin 49a on the lower link 47, all in a known manner.

Figure 8:
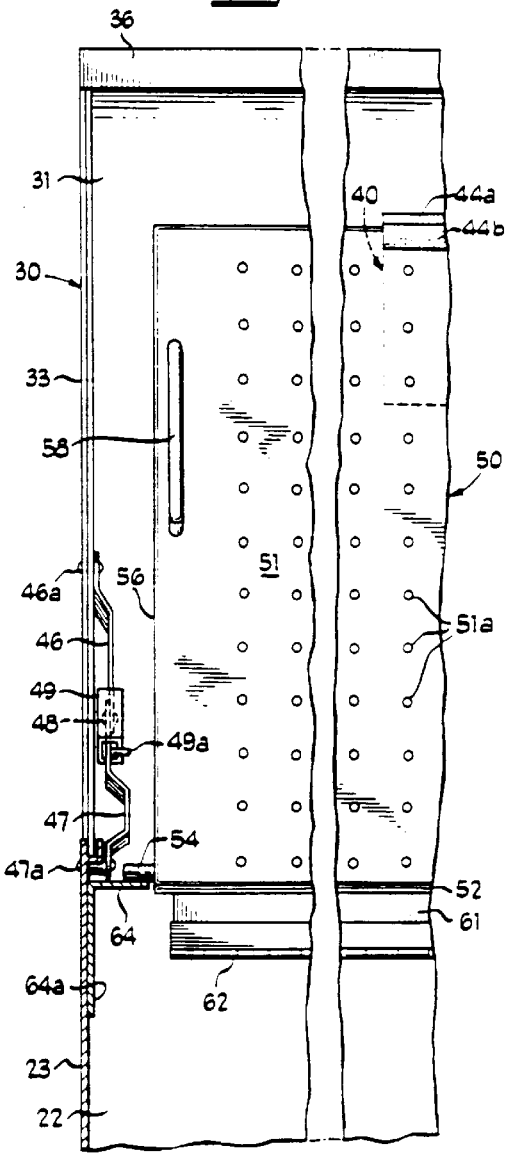
FIG. 8 is a front elevational view of the portion of the cover and tool pallet illustrated in FIG. 7, with the attached portion of the base shown in vertical section.
Figures 6, 7, 9, 10:
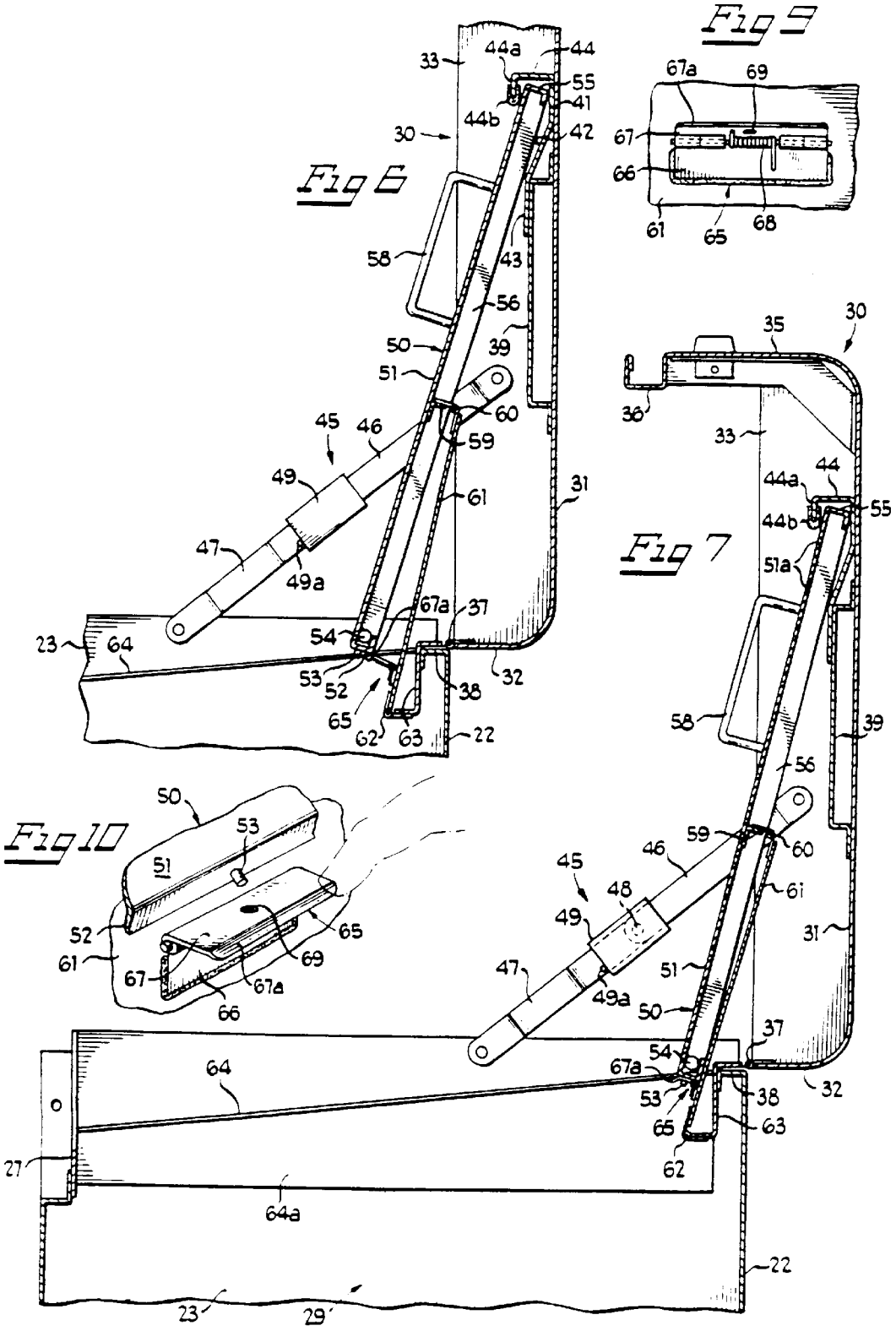
FIG. 6 is a view similar to FIG. 5, illustrating the tool pallet being brought into its display position.
FIG. 7 is a view similar to FIG. 6, illustrating the tool pallet latched in its display position.
FIG. 9 is a further enlarged, fragmentary, front elevational view of the pallet latch hinge in its normal rest position.
FIG. 10 is a fragmentary, perspective view of the latch hinge of FIG. 9, illustrating disengagement of the latch.
Figure 11:
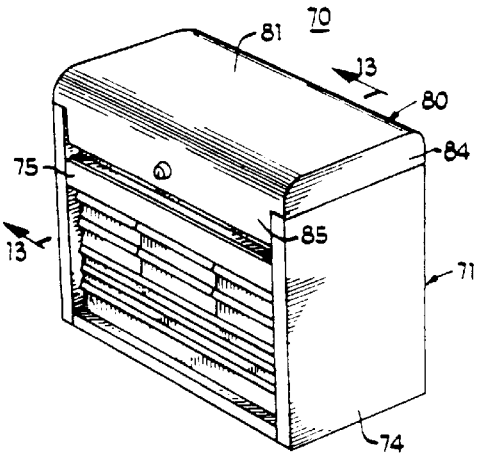
FIG. 11 is a front perspective view of a tool chest in accordance with a second embodiment of the invention, with the cover closed.
Figure 12:
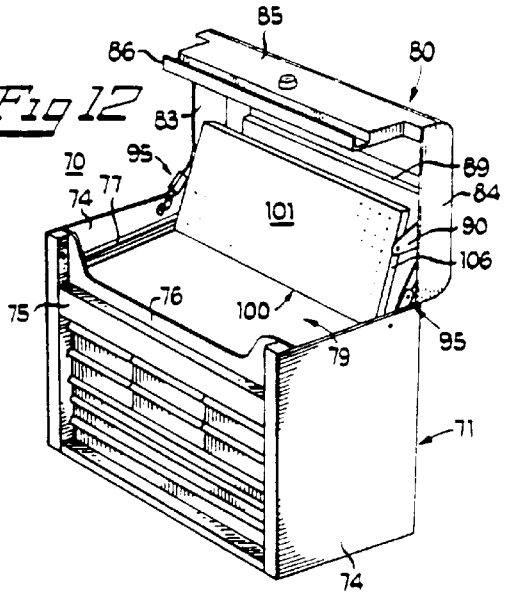
FIG. 12 is a view similar to FIG. 11, with the cover open and the tool pallet in its display position.
Figure 13:
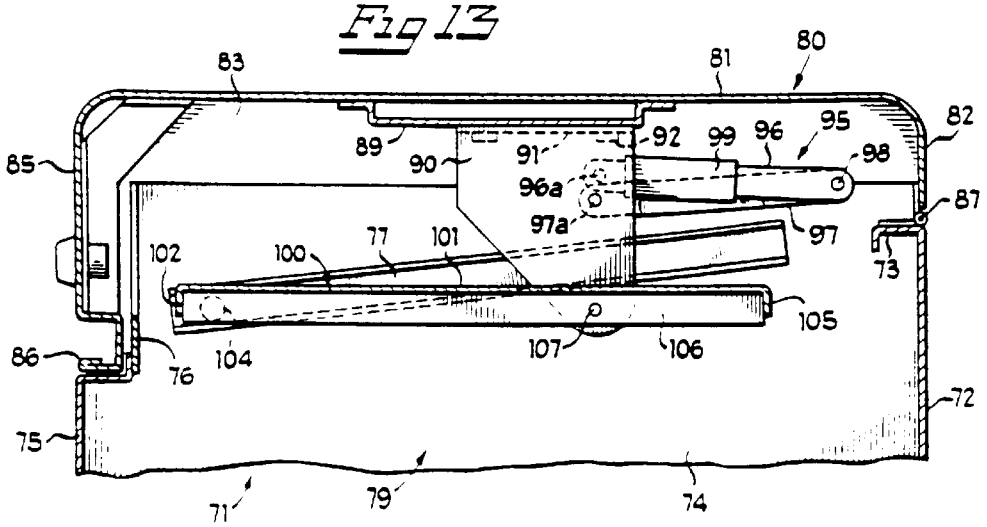
FIG. 13 is an enlarged, fragmentary view in vertical section taken along the line 13—13 in FIG. 11.

Referring now also to FIGS. 6–8, it is a fundamental aspect of the invention that the tool chest 20 also includes a tool pallet 50 in the nature of a flat, rectangular panel having an obverse side 51 and being provided with a plurality of holes 51a therethrough, preferably arranged in a matrix or grid in the nature of a pegboard. The pallet 50 may be provided with a plurality of clips or brackets (not shown) fitted through holes 51a for releasably securing a plurality of tools (not shown) on the obverse side 51 of the pallet 50, in a known manner. It is a significant aspect of the invention that the pallet 50 is mounted in the tool chest 20 for movement between a horizontal stowed position, illustrated in FIGS. 1 and 3, wherein it substantially completely overlies and covers the storage compartment 29, and an upright display position, illustrated in FIGS. 2, 7 and 8, wherein tools mounted thereon are displayed for use and the storage compartment 29 is uncovered, permitting easy access thereto.

The pallet 50 has at its front edge a depending front flange 52 provided centrally thereof with a forwardly projecting latch pin 53 (FIGS. 3–7). Fixedly secured to the pallet 50 immediately behind the front flange 52, respectively at the opposite sides thereof, are two laterally outwardly projecting guide pins or rollers 54 (one shown). Integral with the pallet 50 at its rear end is a depending rear flange 55, and respectively integral with its opposite side edges are depending side flanges 56. Fixedly secured to the pallet 50 along the opposite sides thereof and toward the rear end thereof are a pair of upstanding handles 58. Fixedly secured, as by welding, to the reverse or underside of the pallet 50, generally centrally thereof and extending laterally thereof, is an elongated angle bracket 59, which is pivotally coupled by a piano hinge 60 to the forward edge of a rectangular coupling plate 61. The rear end of the coupling plate 61 is pivotally coupled by a piano hinge 62 to the bottom flange of a Z-shaped bracket 63 which depends from the top flange 38 of the base rear wall 32. The guide pins or rollers 54 of the pallet 50 are respectively disposed for sliding or rolling engagement with forwardly and downwardly sloping guide rails 64, respectively fixedly secured to the side walls 23 and 24 of the tool chest base 21 by attachment flanges 64a (one shown).

Referring also to FIGS. 9 and 10, the coupling plate 61 carries on its underside adjacent to the rear end thereof and laterally centrally thereof, a latch hinge 65. More specifically, the latch hinge 65 has one plate 66 thereof fixedly secured, as by welding, to the coupling plate 61 and has the other plate 67 thereof free to pivot. The free plate 67 has an inclined lip 67a at its distal end and is resiliently biased by a torsion spring 68 to a rest position (FIGS. 3–5) disposed at an angle slightly greater than 90° with respect to the plate 66. Formed in the free plate 67 centrally thereof is a circular hole 69, for a purpose to be described below.

In operation, when the pallet 50 is in its stowed position, illustrated in FIGS. 1 and 3, the rear flange 55 rests on the bottom flange of the Z-shaped bracket 63, and the guide pins or rollers 54 are supported by the guide rails 64 for firmly supporting the pallet 50. It can be seen that in this stowed position, the pallet 50 covers the storage compartment 29 and permits the tool chest cover 30 to be closed. When the cover 30 is opened, the pallet 50 can be manually lifted to its display position. In this regard, the user grasps the two handles 58 and lifts the rear end of the pallet 50, pulling it upwardly and rearwardly, as indicated in FIGS. 4–6, to insert the rear flange 55 into the channel formed by the base wall 41, the end wall 44, and the lip 44a of the retainer bracket 40, as illustrated in FIG. 6. The guard 44b protects the pallet from being scratched by the lip 44a. During this movement, the coupling plate 61 prevents the pallet 50 from being lifted free of the tool chest 20, and the front end of the pallet 50 remains supported on the guide rails 64 by the guide pins or rollers 54. In this way the coupling plate 61 and the guide rails 64 cooperate to guide the movement of the pallet 50 between its stowed and display positions.

Referring to FIG. 6, when the rear flange 55 of the pallet 50 is fitted into the channel of the retainer bracket 40, the user pushes the pallet 50 rearwardly, moving the latch pin 53 into camming engagement with the lip 67a of the latch plate 67 to depress it against the urging of the spring 68, allowing the pin 53 to snap into the hole 69 with the plate 67 biased against the front flange 52 of the pallet 50. It will be appreciated that the pallet 50 is now securely latched in its display position. The retainer bracket 40 prevents the pallet 50 from tipping forwardly on the piano hinge 62, and the latch hinge 65 prevents the forward end of the pallet 50 from sliding, by gravity, back down along the guide rails 64. It can be seen that when the pallet 50 is disposed in its display position, any tools mounted thereon can be easily viewed and accessed by a user. At the same time, the storage compartment 29 is completely unobstructed by the pallet 50, for easy access thereto.

When it is desired to return the pallet 50 to its stowed position the user manually depresses the latch plate 67 (see FIG. 10) and pulls the lower end of the pallet 50 forwardly to release it from the latch hinge 65. Then the front end of the pallet 50 is allowed to slide down along the guide rails 64, the user supporting the pallet 50 by the handles 58 until it has been returned to its stowed position. As can be seen from FIGS. 1 and 3, the front wall 27 of the housing 21 is cut away or recessed along most of its length so that, when the pallet 50 is disposed in its stowed position, it sits slightly above the top edge of the cutaway portion of the front wall 27. This permits the user to insert his fingers beneath the front edge of the pallet 50 to manually lift it a slight distance, such as a couple of inches, as permitted by the linkage assemblies 45, to retrieve tools from the storage compartment 29, without moving the pallet 50 to its display position.

Referring now to FIGS. 11–19, there is illustrated a tool chest 70, constructed in accordance with another embodiment of the invention. The tool chest 70 is similar to the tool chest 20, described above, having a box-like base 71 which is substantially the same as the base 21. Specifically, the base 71 includes a rear wall 72 provided with a forwardly projecting top flange 73 at the upper end thereof, upstanding side walls 74 and a front cross bar 75 connected to a recessed front wall 76 for cooperation with a top wall (not shown) to define a storage compartment 79. Respectively fixedly secured, as by welding, to the inner surfaces of the side walls 74 are two forwardly and downwardly inclined guide channels 77 (one shown).

The tool chest 70 has a cover 80 which includes a top wall 81, a rear wall 82, opposed side walls 83 and 84 and a front wall 85 provided at its lower end with a channel 86. The lower edge of the cover rear wall 82 is pivotally connected by a piano hinge 87 to the top flange 73 of the base rear wall 72. Fixedly secured to the inner surface of the cover top wall 81 and extending laterally thereof generally centrally thereon is a stiffening channel 89.

Figure 15:
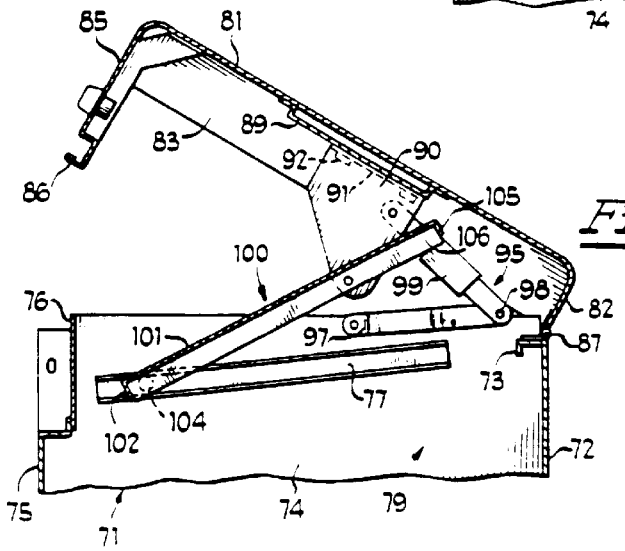
FIG. 15 is a view similar to FIG. 14, illustrating the cover moved to a further opened position.
Figure 16:
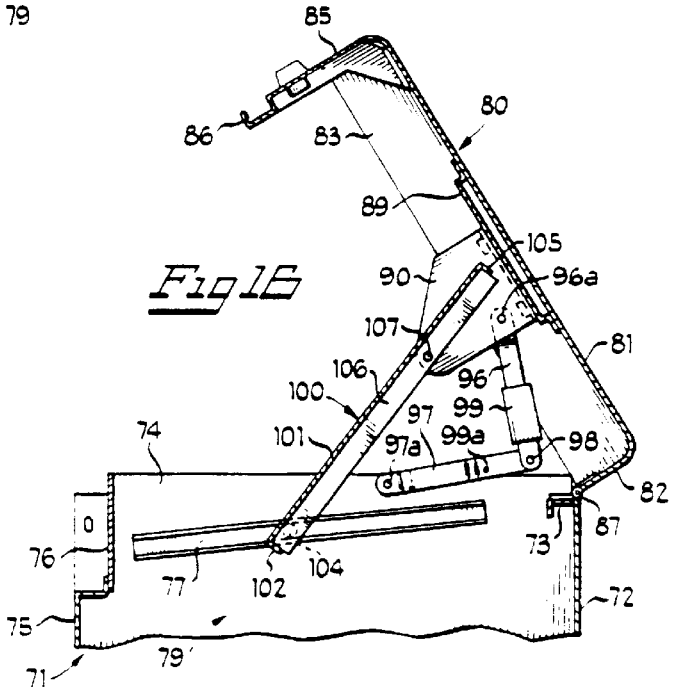
FIG. 16 is a view similar to FIG. 14, illustrating a still further opened position of the cover.

The cover 80 is also provided with a pair of depending ears 90, respectively disposed adjacent to the opposite sides thereof just rearwardly of the lateral center line of the cover 80. More specifically, each of the ears 90 is provided with an attachment flange 91 which is fixedly secured to the stiffening channel 89, as by fasteners 92 or spot welding. The cover 80 is also provided at its opposite sides with linkage assemblies 95, which are arranged as mirror images of each other and operate in the same manner as the linkage assemblies 45, described above. Thus, each of the linkage assemblies 95 includes link arms 96 and 97, respectively pivotally connected to the [cover side walls 83 and 84] *ears 90* and the base side walls 74, as at 96a and 97a, and pivotally connected to each other by pivot pin 98. A sleeve 99 locks the cover 80 in its open position and is stopped against a pin 99a (FIGS. 15–17).

The tool chest 70 includes a tool pallet 100 in the nature of a flat, rectangular panel having an obverse side 101 and being provided with a plurality of holes 110a therethrough (FIG. 18), preferably arranged in a grid or matrix configuration in the nature of a pegboard. The pallet 100 is provided at its front end with a depending front flange 102. Fixedly secured to the underside of the pallet 100 just rearwardly of the front flange 102 at the opposite sides thereof are two laterally outwardly projecting guide pins or rollers 104, respectively receivable in sliding or rolling engagement in the guide channels 77. The pallet 100 is provided at its rear end with a depending rear flange 105 and is provided along its opposite side edges with depending side flanges 106. The cover ears 90 are respectively pivotally connected by pivot pins 107 to the pallet side flanges 106 toward the rear ends thereof.

Figure 14:
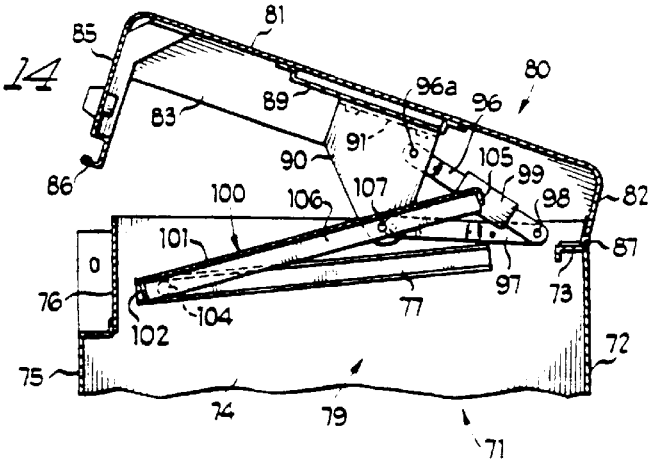
FIG. 14 is a view similar to FIG. 11, with the cover illustrated partially open.

In use, it will be appreciated that the cover 80 is movable between fully open and closed positions in the same manner as was described above in connection with the cover 30. Because of the pivotal connection between the cover ears 90 and the pallet 100, movement of the cover 80 between its open and closed positions will result in a corresponding movement of the pallet 100, this movement being guided by the engagement of the guide pins or rollers 104 in the guide channels 77. More specifically, when the cover 80 is closed, the pallet 100 is disposed substantially horizontally just above the base front wall 76, overlying and substantially covering the storage compartment 79. As the cover 80 is opened, the rear end of the pallet 100 is lifted and the front end thereof slides upwardly and rearwardly along the guide channels 77, as illustrated in FIGS. 14–16. When the cover 80 is latched in its fully open position, illustrated in FIGS. 17–19, the pallet 100 is disposed in its upstanding display position, adjacent to the rear end of the tool chest 70, with the tools thereon displayed forwardly for easy viewing and access. The latching of the cover 80 in its open position by the linkage assemblies 95 prevents the pallet 100 from sliding back down toward its stowed position. It can be seen that when the pallet 100 is thus disposed in its display position, the storage compartment 79 is uncovered, accommodating easy access thereto. It will be appreciated that, when the cover 80 is unlatched and closed, the pallet 100 responds by returning to its stowed position.

From the foregoing, it can be seen that there has been provided an improved tool chest with a built-in tool pallet which is easily movable between a stowed position covering a storage compartment and an upright display position permitting easy access to the storage compartment.

We claim:

[1. In a tool chest including a bottom wall and peripheral wall structure having a forward end and a rearward end and upstanding from said bottom wall for cooperation therewith to define an open-top storage compartment therein, and a cover coupled to the peripheral wall structure adjacent to the rearward end thereof for movement between a closed position to close the storage compartment and an upstanding open position exposing the storage compartment, the improvement comprising: a tool pallet having an obverse side for supporting tools thereon and a reverse side and disposed in the tool chest and shiftable between first and second positions relative thereto, coupling means permanently connecting said pallet to said tool chest and accommodating movement of said pallet between said first and second positions, said pallet in its first position overlying and covering the storage compartment with said obverse side facing away from the bottom wall, said pallet in its second position being inclined with respect to the bottom wall with the cover in its open position and with said obverse side facing toward the forward end of the wall structure and with said reverse side facing the cover so as to uncover the storage compartment and permit access thereto, and support means on the tool chest for supporting said pallet in each of its first and second positions, said support means including a pair of elongated guide rails disposed on opposite sides of the peripheral wall structure, and means on said pallet engageable with said guide rail.]

[2. In a tool chest including a bottom wall and peripheral wall structure having a forward end and a rearward end and upstanding from aid bottom wall for cooperation therewith to define an open-top storage compartment therein, and a cover coupled to the peripheral wall structure adjacent to the rearward end thereof for movement between a closed position to close the storage compartment and an upstanding open position exposing the storage compartment, the improvement comprising: a tool pallet having an obverse side for supporting tools thereon and a reverse side and disposed in the tool chest and shiftable between first and second positions relative thereto, said pallet in its first position overlying and covering the storage compartment with said obverse side facing away from the bottom wall, said pallet in its second position being inclined with respect to the bottom wall with the cover in its open position and with said obverse side facing toward the forward end of the wall structure and with said reverse side facing the cover so as to uncover the storage compartment and permit access thereto, means coupling said pallet to the cover and responsive to movement of the cover between its closed and open positions for effecting movement of said pallet between its first and second positions, and guide means on the peripheral wall structure cooperating with said coupling means for supporting said pallet in each of its first and second positions and for guiding movement of said pallet between its first and second positions.]

[3. The tool chest of claim 2, wherein said coupling means includes means pivotally coupling said pallet to the cover.]

[4. The tool chest of claim 3, wherein said coupling means includes a pair of side flanges on said pallet depending therefrom along opposite sides thereof, a pair of ears on the cover projecting from opposite sides thereof, and means pivotally connecting said ears respectively to said side flanges.]

[5. The tool chest of claim 2, wherein said guide means includes a pair of guide rails respectively disposed along opposite sides of the peripheral wall structure.]

[6. The tool chest of claim 5, wherein said pallet includes rollers rotatably carried thereby and respectively disposed for rolling engagement with said guide rails.]

*7. A tool chest comprising:*

*a bottom wall and peripheral wall structure having a forward end and a rearward end and upstanding from said bottom wall to define an open-top storage compartment,*

*a cover coupled to the wall structure adjacent to the rearward end thereof for cooperation therewith to define an enclosure and movable between a closed position and an upstanding open position relative to the storage compartment,*

*a tool pallet disposed in said enclosure and having front and rear ends and an obverse side for supporting tools thereon and a reverse side,*

*coupling structure permanently connecting said pallet to said enclosure and accommodating movement of said pallet between first and second positions,*

*said pallet in its first position overlying and covering the storage compartment with said obverse side facing away from the bottom wall,*

*said pallet in its second position being inclined with respect to the bottom wall with the cover in its open position and with said obverse side facing toward the forward end of the wall structure and with said reverse side facing the cover so as to uncover the storage compartment and permit access thereto, and*

*support structure on the enclosure for supporting said pallet in each of its first and second positions,*

*said support structure including a pair of elongated guide rails disposed on opposite sides of the wall structure and guide structure on the pallet engageable with the rails,*

*said coupling structure including a pair of side flanges on said pallet depending therefrom along opposite sides thereof, a pair of ears on said cover protecting from opposite sides thereof, and pivot joints connecting said ears respectively to said side flanges.*

*8. A tool chest comprising:*

*a bottom wall and peripheral wall structure having a forward end and a rearward end and upstanding from said bottom wall to define an open-top storage compartment,*

*a cover coupled to the wall structure adjacent to the rearward end thereof for cooperation therewith to define an enclosure and movable between a closed position and an upstanding open position relative to the storage compartment,*

*a tool pallet disposed in said enclosure and having front and rear ends and an obverse side for supporting tools thereon and a reverse side,*

*coupling structure permanently connecting said pallet to said enclosure and accommodating movement of said pallet between first and second positions,*

*said pallet in its first position overlying and covering the storage compartment with said obverse side facing away from the bottom wall,*

*said pallet in its second position being inclined with respect to the bottom wall with the cover in its open position and with said obverse side facing toward the forward end of the wall structure and with said reverse side facing the cover so as to uncover the storage compartment and permit access thereto, and*

*support structure on the enclosure for supporting said pallet in each of its first and second positions,*

*said support structure including a pair of guide rails respectively disposed along opposite sides of the wall structure,*

*said pallet including rollers rotatable carried thereby and respectively disposed for rolling engagement with said guide rails.*

*9. The tool chest of claim 8, wherein said coupling structure includes structure connecting said pallet to said wall structure.*

*10. The tool chest of claim 9, wherein said pallet includes handle means for facilitating manual movement thereof between the first and second positions thereon.*

*11. In a tool chest including a bottom wall and peripheral wall structure having a forward end and a rearward end and upstanding from said bottom wall for cooperation to define an open-top storage compartment therein, and a cover coupled to the peripheral wall structure adjacent to the rearward end thereof for movement between a closed posi-*

*tion to close the storage compartment and an upstanding open position exposing the storage compartment, the improvement comprising:*

*a tool pallet having an obverse side for supporting tools thereon and a reverse side and disposed in the tool chest and shiftable between first and second positions relative thereto,*

*said pallet in its first position overlying and covering the storage compartment with said obverse side facing away from the bottom wall,*

*said pallet in its second position being inclined with respect to the bottom wall with the cover in its open position and with said obverse side facing toward the forward end of the wall structure and with said reverse side facing the cover so as to uncover the storage compartment and permit access thereto,*

*means coupling said pallet to the cover and responsive to movement of the cover between its closed and open positions for effecting movement of said pallet between its first and second positions,*

*and guide means on the peripheral wall structure cooperating with said coupling means for supporting said pallet in each of its first and second positions and for guiding movement of said pallet between its first and second positions,*

*said coupling means including a pair of side flanges on said pallet depending therefrom along opposite sides thereof, a pair of ears on the cover protecting from opposite sides thereof, and means pivotally connecting said ears respectively to said side flanges.*

*12. In a tool chest including a bottom wall and peripheral wall structure having a forward end and a rearward end and upstanding from said bottom wall for cooperation to define an open-top storage compartment therein, and a cover coupled to the peripheral wall structure adjacent to the rearward end thereof for movement between a closed position to close the storage compartment and an upstanding open position exposing the storage compartment, the improvement comprising:*

*a tool pallet having an obverse side for supporting tools thereon and a reverse side and disposed in the tool chest and shiftable between first and second positions relative thereto,*

*said pallet in its first position overlying and covering the storage compartment with said obverse side facing away from the bottom wall,*

*said pallet in its second position being inclined with respect to the bottom wall with the cover in its open position and with said obverse side facing toward the forward end of the wall structure and with said reverse side facing the cover so as to uncover the storage compartment and permit access thereto,*

*means coupling said pallet to the cover and responsive to movement of the cover between its closed and open positions for effecting movement of said pallet between its first and second positions,*

*and guide means on the peripheral wall structure cooperating with said coupling means for supporting said pallet in each of its first and second positions and for guiding movement of said pallet between its first and second positions,*

*said guide means including a pair of guide rails respectively disposed along opposite sides of the peripheral wall structure,*

*said pallet including rollers rotatable carried thereby and respectively disposed for rolling engagement with said guide rails.*

*13. The tool chest of claim 12, wherein said means coupling includes structure connecting said pallet to said wall structure.*

*14. The tool chest of claim 13, wherein said pallet includes handle means for facilitating manual movement thereof between the first and second positions thereon.*

* * * * *